Figure 1:
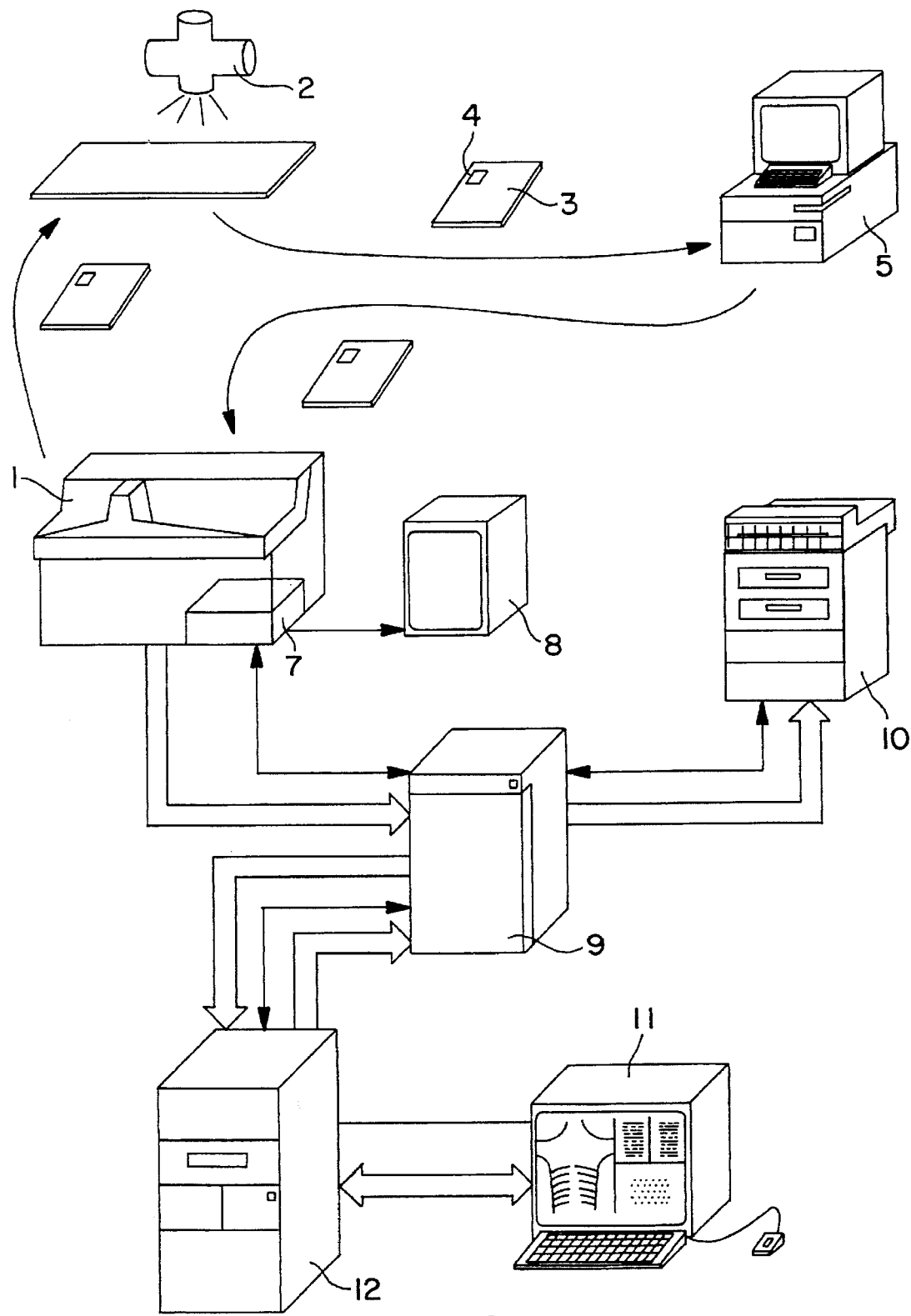

United States Patent [19]

Dewaele et al.

[11] Patent Number: 5,646,417
[45] Date of Patent: Jul. 8, 1997

[54] CUSTOMIZED AND CONFIGURATED RADIATION IMAGE READ OUT SYSTEM

[75] Inventors: Piet Dewaele, Berchem; Pieter Vuylsteke, Mortsel, both of Belgium

[73] Assignee: Agfa-Gevaert, Mortsel, Belgium

[21] Appl. No.: 427,967

[22] Filed: Apr. 26, 1995

[30] Foreign Application Priority Data

Apr. 29, 1994 [EP] European Pat. Off. ............... 94201183

[51] Int. Cl.$^6$ ..................................................... G03B 42/02
[52] U.S. Cl. ............................................ 250/584; 250/587
[58] Field of Search ....................................... 250/587, 584

[56] References Cited

U.S. PATENT DOCUMENTS 5,014,045  5/1991  Shimura et al. .
5,172,418  12/1992  Ho et al. .
5,270,530  12/1993  Godlewski et al. ................. 250/208.1

FOREIGN PATENT DOCUMENTS 0077999   5/1983  European Pat. Off. .
WO92/14403  9/1992  WIPO .

*Primary Examiner*—Constantine Hannaher
*Attorney, Agent, or Firm*—Richard J. Birch

[57] ABSTRACT

A system and method for reading and processing a radiation image that has been stored in a photostimulable phosphor screen. An identification station, a read out and processing station and an off-line workstation are provided. A customized and configurated parameter set is generated that links with an examination type a set of parameters. This parameter set is used when controlling operation of each individual station of the system.

7 Claims, 3 Drawing Sheets

CUSTOMIZED AND CONFIGURATED RADIATION IMAGE READ OUT SYSTEM

FIELD OF THE INVENTION

The present invention is in the field of computed radiography. The invention more particularly relates to a method and apparatus for configurating and customizing a system for reading and processing a radiation image stored in a photostimulable phosphor screen.

STATE OF THE ART

In the field of digital radiography a wide variety of image acquisition techniques have been developed that render a digital representation of a radiation image.

In one of these techniques a radiation image, for example an x-ray image of an object, is stored in a screen comprising a photostimulable phosphor such as one of the phosphors described in European patent publication 503 702 published on 16.09.92.

The stored radiation image is read by scanning the screen with stimulating radiation such as laser light of the appropriate wavelength, detecting the light emitted upon stimulation and converting the emitted light into an electric representation for example by means of an adequately adjusted photomultiplier and finally digitizing the signal.

The digital image signal is then processed on-line. It can also be transmitted to a laser recorder for reproduction of the processed image on the film size and lay-out of the radiologist's choice and/or it can be applied to a monitor for display.

It is further possible to sent the image signal to an off-line workstation where the image signal can be subjected to additional processing steps.

After readout the residual image left on the photostimulable phosphor screen is erased so that the screen is again available for exposure.

One of the benefits of a digital radiographic system resides in the possibility of processing the digital image representation. The term "processing" in this context means any kind of image processing such as noise filtering, contrast enhancement, data compression etc.

It is possible to subject one image to different processing techniques or to apply the same processing technique with different parameter settings to the same image.

Because of the large number of examination and sub-examination types and the wide variety of parameter settings available for each examination type, a large number of selections and decisions are demanded from the operator or the radiologist for each examination.

This rather complex selection process is very time-consuming and might lead to erroneous settings or inappropriate selections so that the image processing step does not render the expected results and might have to be repeated.

Specialized radiologists often perform the same types of examinations so that they repeatedly need to perform the same adjustments and make the same selections for identifying an image and for setting all kind of read out and processing parameters.

These facts have inspired the inventors to design an identification station that operates on the basis of selection of menu items.

Upon entering, in addition to the patient identification data, the data relating to the examination type and data identifying the referring radiologist a number of adjustment values and processing parameters are automatically selected and associated with the image.

These parameters or at least an indication thereof then accompany the radiation image to the read out station and on-line processing station as well as to the off-line workstation.

This kind of operation is very efficient and requires a minimal of interventions by the radiologist. However, this procedure demands that the selections of parameter values that match with the radiologist's choice, a process referred to as 'customizing', are performed in advance.

U.S. Pat. No. 5,014,045 discloses a read out apparatus comprising a read-out component, an image processing component, and a menu item display and selection component.

The menu item display and selection component is constituted of a storage section for storing menu items and corresponding read-out conditions, an object portion designation section for designating the portion of the object who's image is to be read out, an image recording method designation section for designating the image recording method by which the image was recorded, a mode selection section for selecting one menu from a plurality of menus constituted by classifying a large number of menu items which have once been classified with respect to all possible combinations of object portion and image recording condition, a display section for displaying menu items, a selection section for selecting a displayed menu item, and a processing section for reading from the storage section menu items relating to the designated object portion and image recording method and forwarding the read-out menu items to the display section, reading menu items from the storage section and forwarding them to the display, and forwarding to the read-out component the read out condition corresponding to the required item.

This document does not disclose in what way customizing and configuration of the read out and processing system was performed.

OBJECTS OF THE INVENTION

It is therefore an object of the present invention to provide a system, for reading a radiation image stored in a photostimulable phosphor screen and processing said image, that is customized to the client's requirements and hence provides efficient and fast identification and setting of the parameters required during operation.

It is a further object to provide such a system wherein the configuration of the read out and processing system is identified.

It is a further object of the present invention to provide such a system that can be easily adapted if data or settings are to be amended.

Further objects will become apparent from the description hereinafter.

STATEMENT OF THE INVENTION

To achieve the above objects the present invention provides a system for reading a radiation image that has been stored in a photostimulable phosphor screen and processing said image comprising (i) an identification station for entering and displaying data identifying said image, (ii) a read out station for reading said image and converting the read-out image into a digital image representation;

(iii) an image processing station for carrying out image processing on the digital image representation, characterised in that the system further comprises means for generating a customized image processing and configuration parameter set that associates with an examination type a set of identification, read out and processing parameters, storage means in each of said stations for storing said customized image processing and configuration parameter set, selection means in each station for selecting parameters that are required for operation of a station out of said customized parameter set, control means for controlling the operation of a station on the basis of the selected parameters.

The term 'customized image processing and configuration parameter set' refers to the following three parameter sets: customized image processing parameter set, customized identification station parameter set and customized configuration parameter set.

By the term 'customized image processing parameter set' is meant a parameter set that comprises image processing parameters to be attached to one or more examination types and subtypes of interest to the user of the read out and processing system.

By the term 'customized identification parameter set' is meant a parameter set for the operation and lay-out of the identification station, whereby this set is supplied for each of the examination types and subtypes.

By the term 'customized configuration parameter set' is meant a parameter set comprising information on the specific configuration of the customer such as hard copy image layouts, hospital name, list of connected hardware etc. These data may be used by each of the stations (identification station, read-out station, and workstation).

In a first embodiment said means for generating a customized image processing and configuration parameter set comprise a so-called film book, a reference parameter set associated with the film book, and a means for identifying (an) item(s) in said reference parameter set and for performing selections on this reference parameter set.

The film book comprises a large number of reproductions of radiographic images on conventional hard copy film. The set of hard copy images is selected so that a wide range of examination types and subtypes is covered and that for all these examination types copies are provided that are achieved by performing image processing with different parameter settings and that have different lay outs etc.

In the film book a radiologist can make a selection among the available processing types and presentations of the hard copy images for the examination types of his interest.

So, on the basis of hard copy images he can indicate the way in which he intends to have the images reproduced for the examination types of his interest.

Alternative presentations of the radiographic images such as CD-ROM images are possible.

With this film book a description of the parameter settings used when producing each of the hard copies in the film-book is associated. In accordance with the present state of the art techniques these parameter settings are stored in the form of a digital data file on floppy disk. However alternatives are possible. This parameter set is referred to as "reference parameter set".

The reference parameter set is structured as a set of different tables. The first table comprises examination types, examination subtypes—each in different supported languages—a qualifier and an address referring to a second table.

The qualifier indicates the psycho-visual outlook of the image as it will be processed in accordance with the attached parameter set.

The second table is correlated with settings for the identification station and with a menu number that refers to a third table comprising image processing parameters.

The identification station parameter settings are for example: film layout, exposure class, patient orientation, cassette orientation, erasure time, number of copies, archive code . . . .

The image processing parameter settings are for example: image partitioning configuration, data concerning the algorithm used for finding the diagnostically relevant signal range, name of sensitometric mapping curve etc.

Figure 3:
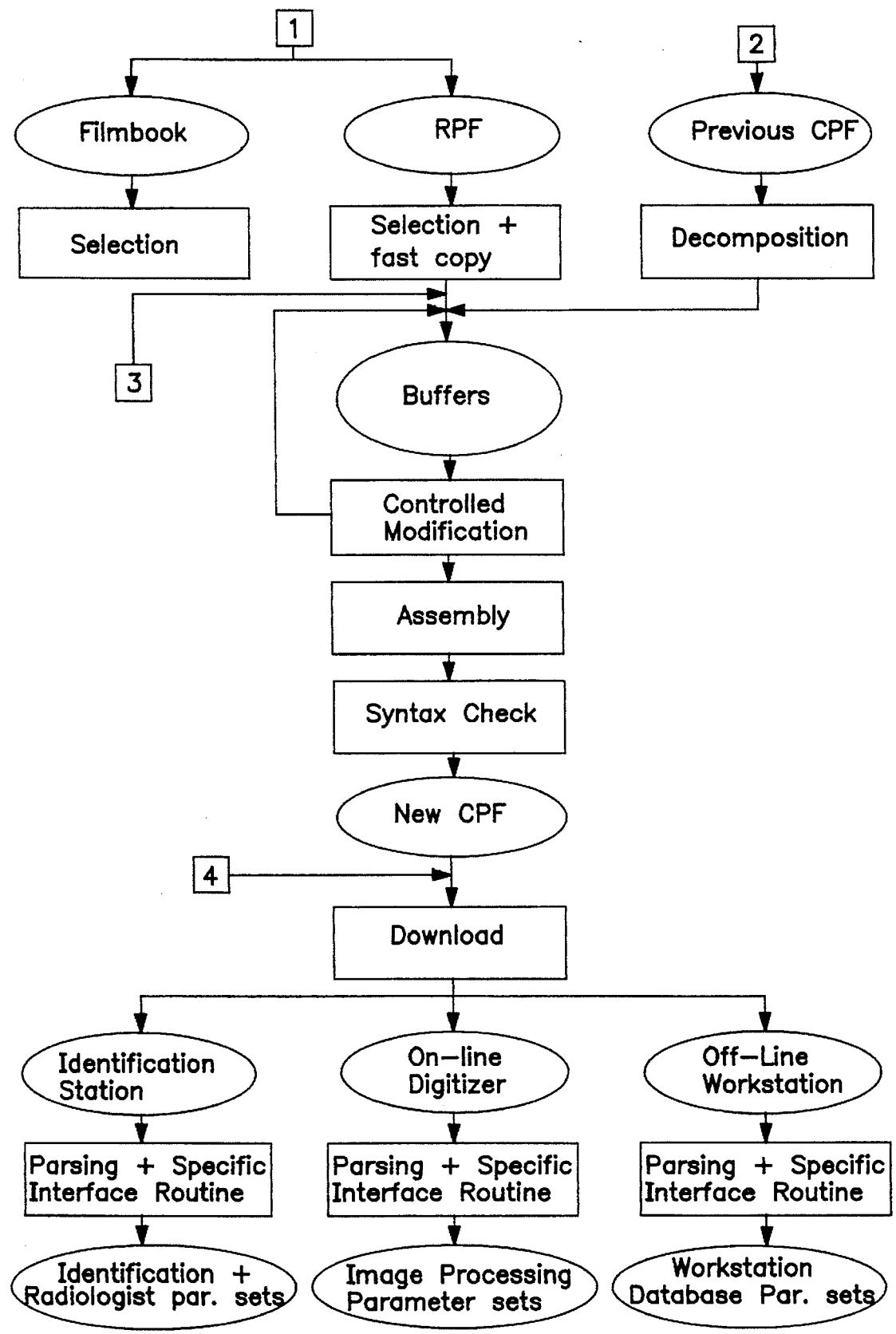

Several ways of generating the customized parameter set are described hereafter with reference to FIG. 3.

In one embodiment the means for generating a customized image processing and configuration parameter set further comprise means for identifying (an) item(s) in said reference parameter set and for performing selections on this reference parameter set.

By identification of an item is meant the search, selection, and the association of an item with the particular value found. An item can be a numeric indexing key, or one or more alphanumeric strings.

An example of such means are means for copying the reference file from a floppy into the memory of a personal computer and then by adding the radiologist's name in a dedicated field of a record that comprises for a certain examination type and examination subtype the parameters that correspond with a hard copy selected by the radiologist in the film book.

Next, selection means provide that a selection can be made of all examination types and subtypes and corresponding parameter settings this radiologist intends to apply when performing a specified examination type.

In a second embodiment said means for generating a customized parameter set comprise an existing previously customized parameter set, and means for changing records of the old customized parameter set.

In an alternative of this second embodiment said means for generating a customized parameter set comprise an existing customized parameter set and a reference parameter set associated with a film book and means for replacing records of said existing parameter set by records of said reference parameter set.

In a third embodiment said means for generating a customized parameter set operate on an existing parameter set and comprise means for decomposing said existing parameter set into components, and storage buffers on a memory disk for storing each of the components, means for reading information from said buffers and amending said information and means for composing by means of the amended information a new customized parameter set.

This last mentioned embodiment is particularly advantageous when a personal computer is used for making the selections since in case of any unattended or undetected bug or program hang up or power failure (on portables e.g.) all data that would normally have been lost when they were stored in RAM only, can now be retrieved from the buffers.

In order to prevent having to redo all previously performed work, the buffers contain all necessary data to recover from scratch.

Also an interruption of the customizing process before a final customized parameter set is composed is possible since the information in the buffers is not deleted so that normal customizing operation can be resumed from the point where the interruption took place.

After final assembly of the customized parameter set the information in the buffers is not deleted so that the same buffers can serve as a starting point for a new modification or addition. The information of the buffers can be assembled to form a new set.

The system of the present invention further provides means for storing the customized parameter set in each of the individual stations part of the read out and processing system, namely the identification station, the read-out station and the processing station.

Most conveniently the customized parameter set is generated on a personal computer and stored on a floppy disk. It is subsequently copied from the floppy disk or downloaded into the memory provided in the identification station, the read out station or the work station.

Means are provided that select the parameters that are required for the operation of a station. These means perform a so-called 'parsing' operation. Parsing is a process whereby pure alphanumeric information contained in the customized parameter set is read and converted into elementary memory entities stored in the station. This parsing process is executed independently in each of the system stations (identification station, read out station, workstation) in a generic data driven manner, and followed by a specific information extraction process.

The parameter sets are organized as tables, each having a header section, a structure section and a data section. The parameter sets have the data stored in the data section and the corresponding syntax and semantics stored in the structure section.

The parsing process involves memory allocation for each of the parameters, syntactic analysis according to the syntax specified in the structure section, and error reporting upon incorrect syntax or other failure.

The syntax and semantics to which the data adhere is covering all possible format and dimensionality of the data, allowed range for the data and default value.

The specific interface routines on each of the platforms convert the stored elementary entities to whatever needed parameters for subsequent use by the system.

For the identification station, radiologist specific examination data and settings are generated. For the read-out station image processing parameters are stored and for the workstation radiologist specific examination data and image processing parameters are loaded into a data base.

When a parameter set is in itself only an indicator for a set of parameters, each of the sets is known by all the components of the read-out station and on-line processing unit and off-line processing station. Exactly the same parameter set is downloaded to the stations.

This feature provides that the stations operate in a consistent way. By not cloning the information, the use of identical parameter settings is guaranteed, and therefore this results in exactly the same processing when the image would be processed on-line or off-line.

Means are further provided for controlling the operation of each of the stations on the basis of the parameters of the customized parameter set.

In a particular embodiment an exposed photostimulable phosphor screen is conveyed in a cassette provided with a memory device e.g. as an electrically erasable programmable read only memory such as the cassette that has been described in the published European patent application EP 307 760.

When entering in the identification station the name of the radiologist and the examination type, parameters are automatically selected from the customized parameter set that are associated with this examination type and with the name of the radiologist.

A key referring to an item in the customized parameter set is written onto the EEPROM and accompanies in this way the cassette and the exposed screen conveyed in the cassette to the read out station and on-line image processing unit.

In the read out station means are provided for reading the parameters stored in the EEPROM and for adjusting the read out device in correspondence with these parameters.

More specifically the read out device comprises means for opening the cassette, means for exposing the screen to stimulating irradiation, means for detecting the light emitted upon stimulation and means for converting the detected light into an electric signal representation such as a photomultiplier, and finally means for digitizing the electric signal representation.

Means are provided for adjusting the sensitivity of the photomultiplier on the basis of the information that was written into the EEPROM and read from the parsed customized parameters set.

The sensitivity is dependent on the exposure class, the cassette size and the type of the phosphor plate, all of which are written into the EEPROM during identification. On the basis of the key read out of the EEPROM the image processing parameters are retrieved from the customized parameter set.

After read out the radiation image can be processed off-line in the workstation.

The parameters necessary for the image processing and being associated with an examination type and subtype are retrieved from the data base based on the image processing key. Parameters are for example: image partitioning configuration, parameters used for image quality enhancing processing, parameters used for extraction of the diagnostically relevant signal range.

Image processing that can be performed on the read-out image is described in extenso in the following patent applications:

Selection of a diagnostically relevant range: published European patent applications 549 009, 546 600 and European patent application 93 200 376.7; contrast enhancement: published European patent application 527,525; noise reduction: European patent application 93 201 432.7.

The system of the present invention is particularly advantageous in that a complete radiologist-specific setting is provided of parameters throughout the entire system comprising identification station, read out station and workstation.

The parameter set is customized centrally and distributed to all stations of the system implementing consistent operation of all stations. All stations use the same customized parameter file so mistakes can be avoided.

The identification procedure at the identification station is user-friendly, enables fast operation and eliminates repetitively performed selections and settings.

The present invention further comprises a method of reading a radiation image that has been stored in a photostimulable phosphor screen and processing said image wherein i) data identifying said image are entered in an identification station and displayed, (ii) the image is read out, converted into a digital image representation and processed in a read out station;

(iii) the digital image representation is transmitted to a workstation for further processing, characterised in that a customized image processing and configuration parameter set is generated that associates with an examination type a set of identification, read out and processing parameters, said customized image processing and configuration parameter set is stored in the memory of each of said stations, in each station parameters are selected out of said customized parameter set that are required for operation of said station, the operation of a station is controlled on the basis of the selected parameters.

Specific embodiments of the different steps of the method of the present invention are similar to the particular embodiments described with reference to the apparatus and can be found hereinbefore.

Figure 2:
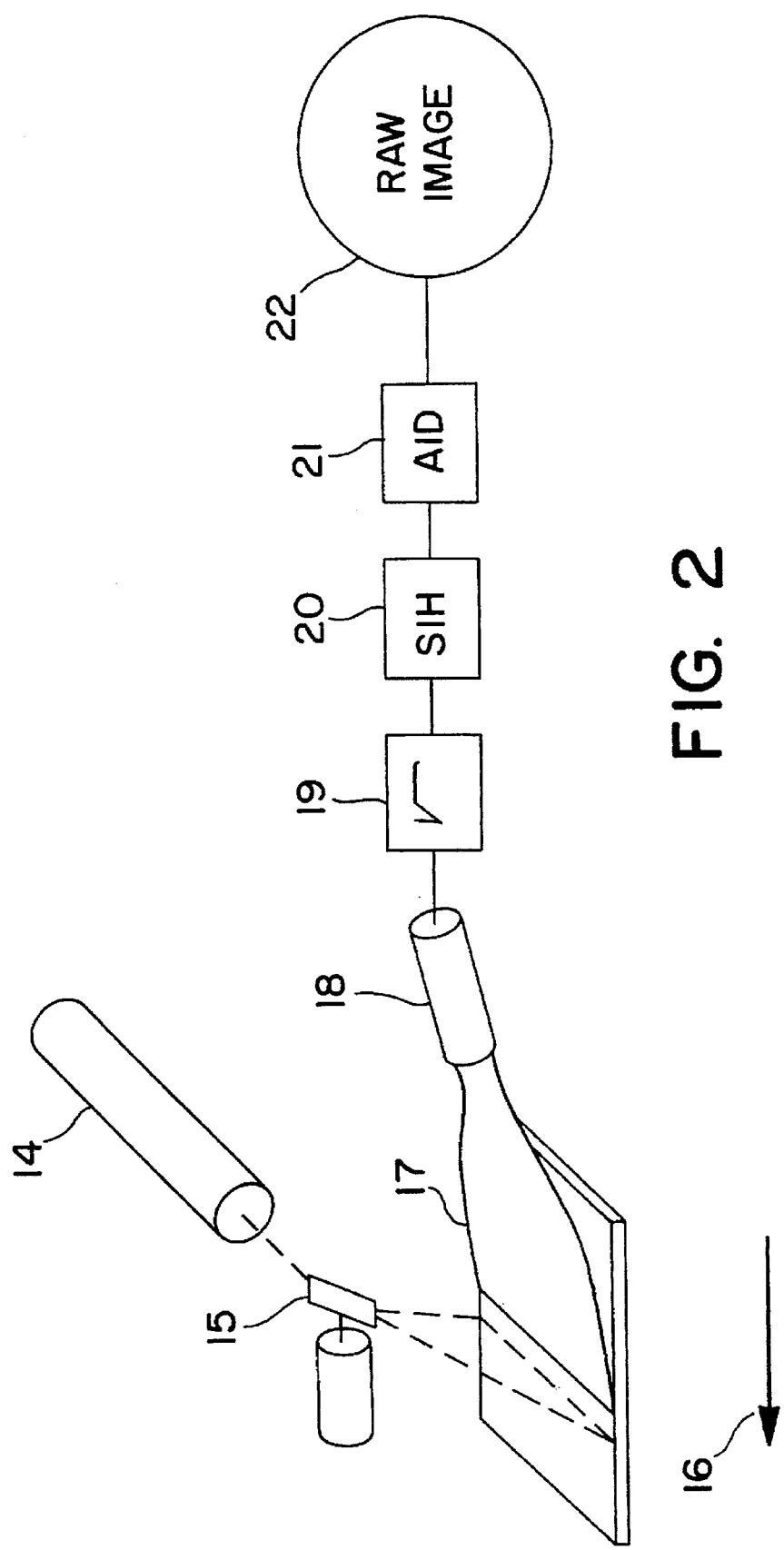

Particular aspects of the present invention as well as preferred embodiments thereof will be illustrated by means of the following drawings in which FIG. 1 is a general view of a system in which the method of the present invention can be applied, FIG. 2 shows an apparatus for reading an image stored in a photostimulable phosphor screen, FIG. 3 is a flow chart illustrating the operation of the system of the present invention.

A radiation image of an object was recorded on a photostimulable phosphor screen by exposing by means of an x-ray source (2) said screen to x-rays transmitted through the object (not shown). The stimulable phosphor screen was conveyed in a cassette (3) provided with an electrically erasable programmable read only memory (EEPROM) (4).

On entry of an exposed cassette in a customized and configurated identification station, the following sequence of presentation selection interactions were needed to identify the cassette, recalling that all presented values are retrieved automatically after having parsed the customized parameter set:

(a) presentation of all known radiologists and selection of a specific radiologist in this list, (b) presentation of all examination types according to the formerly indicated radiologist—selection of an examination type in this list, (c) presentation of all sub-examination types corresponding to the formerly indicated examination type—selection of a specific one in this list, (d) presentation of all layout settings corresponding to the formerly indicated examination and sub examination type.

The presented values are default ones but can be freely altered to one of the attached list. Presented are the patient orientation, the cassette orientation, the exposure class, the number of copies, the erasure time, the screen type.

(e) entry of information field to be printed on film or to be used as a selection filter for the workstation, (f) other parameters which may optionally be presented are RIS parameters (RIS stands for Radiologist Information System), patient birthday and sex, copy and archive configuration, radiologist configuration, and the contents of the EEPROM string.

The following information was written onto the EEPROM: Cassette identification, cassette initialisation date, screen type, terminator and checksum for initialisation data, cassette usage count, acquisition number, patient name and first name, patient identification number, image processing menu key string, image position, exposure class, comment string, name of radiologist, examination type, examination sub type, session number, sequence number, number identified/session, sex, date of birth, number of copies, archive code, erasure time, terminator and checksum for identification data.

Next the cassette was fed into a radiation image read-out apparatus (1) the information stored in the EEPROM and the image stored in the photostimulable phosphor screen were read-out. The cassette conveying the screen was opened and the screen was taken out of the cassette and conveyed to a read out section where the radiation image was read out.

The read-out method is illustrated in FIG. 2. The stored image was read-out by scanning the phosphor screen with stimulating rays emitted by a laser 14. The stimulating rays were deflected into the main scanning direction by galvanometric deflection means 15. The sub-scanning was performed by transporting the phosphor screen in the sub-scanning direction indicated by arrow 16. The stimulated emission was directed by means of a light collector 17 onto a photomultiplier 18 for conversion into an electrical image representation. The sensitivity adjustment of the photomultiplier was performed depending on the exposure class which was entered at the identification station. Next, the signal was amplified by square root amplifier 19, sampled by a sample and hold circuit 20, and converted into a 12 bit signal by means of an analog to digital convertor 21.

The digital raw image signal 22 was sent to the image processing module of the read-out apparatus (FIG. 1, numeral 7) where it was stored in an internal buffer.

Image processing parameters were set in accordance with the information read out of the EEPROM and the data available from image processing parameter sets that were generated by parsing a downloaded customized parameter set, as will be described further on.

In processing unit 7 the digital image signal was subjected to a decomposition into detail images at multiple resolution levels and a residual image. These detail images and residual image were then transmitted from the image processor to the image workstation 11, 12 via a digital communication channel where they were stored on hard disk.

On-line processing generally comprises a modification of the detail images which may serve various purposes followed by a reconstruction of a processed image by applying an inverse transform to the modified detail images and the residual image, the reconstruction process being such that when it would have been applied to the unmodified detail images and the residual image this would have resulted in the original unprocessed image or a close approximation thereof.

The on-line processing was controlled with the aid of data indicative of specific processing procedures that were written into the EEPROM provided on the screen conveying cassette in the identification station (numeral 5 in FIG. 1) in the form of a processing-identifier.

The read-out signal was also applied to a preview monitor 8 for display immediately after read-out providing the operator with an early feed back on the performed exposure.

The read-out apparatus 1 and processing module 7 were further connected to a workstation 11 and associated review console 12 where off-line processing was performed. For the purpose of setting image processing parameters for the off-line processing, the data read from the EEPROM which have accompanied the image to the workstation and image processing parameters retrieved from a database stored by the workstation were used. The data stored in said database were obtained by parsing a customized parameter set.

The read-out apparatus and associated processor as well as the workstation and associated review console were connected via a buffer 9 to an output recorder 10.

Prior to identification of a cassette and read out and processing of an image stored in a screen conveyed by said cassette, the system was configured and customized.

Several ways of configurating and customizing the system are illustrated in FIG. 3. There are four basic entry points for the customization of all system components.

A first entry point is a situation where the customization and configuration has to be started from scratch, this means that no old custom parameter file (CPF) was available.

First, a selection of hard copy images was made by a radiologist from a set of hard copy images gathered in a so-called film book. The hard copy images in the film book were representative of different examination types. For each examination type hard copy images were available that were processed in different ways and that had different lay outs etc.

With the film book corresponds a reference parameter file (RPF), comprising for each of the images in the film book parameters indicating the way in which the images were obtained, i.e. image processing parameter settings, image partition configuration settings etc.

This reference parameter set is resident on the disk of a personal computer and loaded into memory at any time when data selection and extraction is performed on it.

Radiologist's names were added in a dedicated field of all records corresponding with examination types and subtypes selected by the radiologist in the film book.

The data sections of the aforementioned tables were then constructed by copying selectively from the reference parameter set the data corresponding to the radiologist's requested examination types and subtypes. The consistency among the tables was thereby continually checked. Each of the tables constituted one buffer residing on disk.

Started from a scratch situation, a consistent set of buffers, holding all radiologist's specific examination types was obtained.

The customization process further proceeded by making consistent amendments to each of the tables. Such amendment ultimately can change every data field in the data sections of all tables. The following amendments typically are requested by the radiologist:

modification of examination and sub-examination strings, substitution of an image processing parameter set (uniquely identified by one indexing key) in order to alter the processing of the read-out station attached to that examination type, modification of individual image processing parameters in order to alter a specific aspect of the processing result for that examination type, modification of one or more of the identification station parameter settings attached to a particular examination type in order to alter the layout or operation of the identification station at the time of selection of that examination type, addition of complete radiologist-specific examination menu entries, not appearing in the reference parameter set, to fulfil specific customer needs.

All amendments that were made operated on the buffers residing on disk. On completion of all amendments, the buffers were assembled to a final custom parameter set (CPF). Before the parameter set was downloaded to the different subsystems (identification station, read-out station, and workstation) a syntax set of all tables could be executed by running the parser in a specific test mode, in order to ensure that the parameter set would be parsed correctly on all stations as well and a first-time-right operation was ensured.

A second entry point in the customization and configuration process was a situation whereby a previous custom parameter set (cpf) was to be amended on request of the radiologist to accommodate new or modified requirements.

The customized parameter set was decomposed into its constituent buffers, whereby a complete identical situation was created as was present at the end of the start-from-scratch situation.

Therefore, all necessary amendments could be made in exactly the same manner as in the start-from-scratch situation. On completion of the amendments, the buffers were again assembled into a final custom parameter set, again tested on syntactic correctness and downloaded to the stations, thereby overruling the previous custom parameter set. This process of amendment of a previous custom parameter set may be repeated as many times as required.

A third entry point into the customization and configuration process is one where the final assembly was either (a) postponed on purpose or (b) interrupted unexpectedly by system crash or power failure.

Since the buffers reside on disk, all but the last modification is stored permanently and the process could be resumed from the last modification, with minimal or no loss of data. On completion of all amendments to the buffers, they can finally be assembled, tested or downloaded.

A fourth entry point into the customization and configuration process was the situation whereby a customized parameter set, whether new or old, is downloaded to the stations, without modification to it. This situation has arisen upon upgrade of the system software of the stations whereby an existing custom parameter set was to be re-installed.

After download of the custom parameter set, as obtained by one of the four creation possibilities, a parsing program and specific interface routines were run on each of the stations of the system.

The parsing and interface routing applied in the identification station generated the necessary identification station data and the radiologist specific examination and associated image processing key.

Having been applied in the on-line digitizer the parsing program and interface routine resulted in the extraction of image processing parameter sets.

Having been applied in the off-line workstation it resulted in the filling of a database with the following parameter sets: examination and sub-examination types, image processing parameter sets, radiologist set and configuration parameter set.

We claim:

1. A system for reading a radiation image that has been stored in a photostimulable phosphor screen and processing said image comprising an identification station wherein data identifying said image are entered and displayed;

a read out station wherein said image is read out and converted into a digital image representation;

an image processing station for carrying out image processing on the digital image representation, means generating customized identification, read out and processing parameters associated with an examination type and arranging these parameters in a parameter set;

storage means in each of said stations having stored therein said parameter set, selection means in each station arranged to select from said parameter set only parameters that are required for operation of the station in which they are stored;

control means controlling the operation of a station on the basis of the parameters selected in said station.

2. A system according to claim 1 wherein said means for generating a customized parameter set comprise a film book comprising hard copy radiographic images of different examination types processed with different settings of processing parameters, a reference parameter set associated with said film book comprising for each of the hard copy images in the film book the parameter settings used for said hard copy, a computer set up to operate on said reference parameters set and to select from this set examination types and parameters of interest.

3. A system according to claim 1 wherein said means for generating a customized parameter set comprise an existing customized parameter set, a reference parameter set associated with a film book comprising for each of the hard copy images in the film book the parameter settings used for said hard copy, a computer set up to operate on said reference parameters set so as to replace records in said existing parameter set by records out of said reference parameter set.

4. A system according to claim 1 wherein said means for generating a customized parameter set comprise an existing parameter set means for decomposing said existing parameter set into components, storage buffers for storing each of the components, means for reading information from said buffers and amending said information and means for composing by means of the amended information a new customized parameter set.

5. A system according to claim 1 wherein said read out station comprises means for scanning said photostimulable phosphor screen with stimulating irradiation, means for detecting light emitted upon stimulation and converting said light into a digital signal representation.

6. A system according to claim 1 wherein said photostimulable phosphor screen is conveyed in a cassette provided with a memory device and wherein said identification station comprises means for writing data onto said memory device and wherein said read-out station is equipped with means for reading data from said memory device and with means for adjusting a means for detecting light upon stimulation in accordance with the data read from said memory device.

7. A method of reading a radiation image that has been stored in a photostimulable phosphor screen and processing said image wherein i) data identifying said image are entered in an identification station and displayed, (ii) the image is read out, converted into a digital image representation and processed in a read out station;

(iii) the digital image representation is transmitted to a workstation for further processing, characterised in that a customized image processing and configurated parameter set linking with an examination type a set of identification, read out and processing parameters is generated, said customized and configurated parameter set is stored in the memory of each of said stations, in each station parameters are selected out of said customized parameter set that are required for operation of said station, the operation of a station is controlled on the basis of the selected parameters.

* * * * *